(12) United States Patent
Kim et al.

(10) Patent No.: US 8,624,820 B2
(45) Date of Patent: Jan. 7, 2014

(54) LIQUID CRYSTAL DISPLAY WITH PLURAL GATE LINES AND PAIRS OF PIXELS

(75) Inventors: Sung-Man Kim, Seoul (KR); Bong-Jun Lee, Seoul (KR); Shin-Tack Kang, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1941 days.

(21) Appl. No.: 11/588,495

(22) Filed: Oct. 28, 2006

(65) Prior Publication Data

US 2007/0097072 A1    May 3, 2007

(30) Foreign Application Priority Data

Nov. 2, 2005   (KR) ................. 10-2005-0104176

(51) Int. Cl.
- *G09G 3/36* (2006.01)
- *G02F 1/1343* (2006.01)
- *G02F 1/1345* (2006.01)

(52) U.S. Cl.
USPC ............ 345/100; 345/87; 345/98; 349/139; 349/151

(58) Field of Classification Search
USPC ........... 345/87–103, 206; 349/139, 143, 149, 349/151–152
See application file for complete search history.

(56) References Cited

U.S. PATENT DOCUMENTS

| | | | |
|---|---|---|---|
| 6,707,441 B1 * | 3/2004 | Hebiguchi et al. | 345/92 |
| 7,679,596 B2 * | 3/2010 | Kim et al. | 345/98 |
| 2006/0120160 A1 * | 6/2006 | Park et al. | 365/185.22 |
| 2006/0284815 A1 * | 12/2006 | Kwon et al. | 345/98 |

FOREIGN PATENT DOCUMENTS

| | | |
|---|---|---|
| CN | 1620628 | 5/2005 |
| CN | 1637532 | 7/2005 |
| JP | 02-242224 | 9/1990 |
| JP | 06-148680 | 5/1994 |
| JP | 10-073843 | 3/1998 |
| JP | 10-142578 | 5/1998 |
| JP | 11-326943 | 11/1999 |
| JP | 2003-121875 | 4/2003 |
| KR | 1020070001485 | 1/2007 |

* cited by examiner

*Primary Examiner* — Bipin Shalwala
*Assistant Examiner* — Keith Crawley
(74) *Attorney, Agent, or Firm* — F. Chau & Associates, LLC

(57) ABSTRACT

A liquid crystal display (LCD) includes a substrate; first and second pixel rows formed on the substrate and including a plurality of pixels; a first gate line extending in a row direction on the substrate and connected with the first pixel row; a second gate line extending in the row direction on the substrate, connected with the first pixel row; a third gate line extending in the row direction on the substrate, connected with the second pixel row, and adjacent to the second gate line; a fourth gate line extending in the row direction on the substrate, connected with the second pixel row; a plurality of data lines extending in a column direction on the substrate, wherein each of the data lines are disposed every two of the pixels; a first gate driver connected with the first and fourth gate lines and applying gate signals to the first and fourth gate lines; and a second gate driver connected with the second and third gate lines and applying gate signals to the second and third gate lines.

19 Claims, 14 Drawing Sheets

LIQUID CRYSTAL DISPLAY WITH PLURAL GATE LINES AND PAIRS OF PIXELS

CROSS-REFERENCE TO RELATED PATENT APPLICATION

This application claims priority to Korean Patent Application No. 10-2005-0104176, filed in the Korean Intellectual Property Office, on Nov. 2, 2005, the disclosure of which is incorporated by reference herein in its entirety.

BACKGROUND OF THE INVENTION (a) Technical Field

The present disclosure relates to a liquid crystal display (LCD), and more particularly to a device and method that reduces flickers and blurs in the LCD during display.

(b) Discussion of the Related Art

The LCD, one of the most commonly used flat panel displays, includes two display panels with field generating electrodes such as a pixel electrode and a common electrode formed thereon, and a liquid crystal layer formed therebetween. In the LCD, a voltage is applied to the field generating electrodes to generate an electric field on the liquid crystal layer to determine alignment of liquid crystal molecules of the liquid crystal layer and control polarization of incident light, thereby allowing display of images.

The LCD also includes switching elements connected with pixel electrodes and a plurality of signal lines such as gate lines and data lines for controlling the switching elements to apply a voltage to the pixel electrodes. The gate lines transfer gate signals generated by a gate driving circuit, the data lines transfer data voltages generated by a data driving circuit, and the switching elements transfer data voltages to the pixel electrodes according to the gate signals.

A gate driving circuit and a data driving circuit may be directly mounted as a plurality of IC chips on a display panel or mounted on a flexible circuit film attached to a display panel. The IC chips represent a high percentage of the fabrication cost of the LCD. For a large-scale LCD with a high resolution, because the data driver IC chips are expensive as compared to the gate driving circuit chips, the number of data driver ICs needs to be reduced The cost of the gate driving circuit can be reduced by integrating it together with the gate line, the data line, and the switching element. However, the complex structure of the data driving circuit makes it difficult to integrate the data driving circuit with the display panel, so it is important to reduce the number of data driving circuits.

Pixels of an LCD include parasitic capacitance when the signal lines overlap. The parasitic capacitance causes a kickback voltage when a gate-on voltage becomes a gate-off voltage, after a data voltage is applied. The kickback voltage causes a slight reduction in the level of the data voltage. When the next gate-on voltage is changed to the gate-off voltage, the data voltage is further reduced due to the kickback voltage. This causes a difference between a positive polarity pixel voltage and a negative polarity pixel voltage to occur, causing a screen to flicker and display blurs. Thus, there is a need for an LCD with less flickering and blurring.

SUMMARY OF THE INVENTION

An exemplary embodiment of the present invention provides a liquid crystal display (LCD) including: a substrate; first and second pixel rows formed on the substrate and including a plurality of pixels; a first gate line extending in a row direction on the substrate and connected with the first pixel row; a second gate line extending in the row direction on the substrate, connected with the first pixel row; a third gate line extending in the row direction on the substrate, connected with the second pixel row, and being adjacent to the second gate line; a fourth gate line extending in the row direction on the substrate, connected with the second pixel row; a plurality of data lines extending in a column direction on the substrate, wherein each of the data lines are disposed every two of the pixels; a first gate driver connected with the first and fourth gate lines and applying gate signals to the first and fourth gate lines; and a second gate driver connected with the second and third gate lines and applying gate signals to the second and third gate lines.

The first and second gate lines may be arranged with the first pixel row interposed therebetween, and the third and fourth gate lines may be arranged with the second pixel row interposed therebetween.

The first and second gate drivers may be integrated on the substrate.

The first and second gate drivers may be positioned at mutually opposite sides in the row direction.

An exemplary embodiment of the present invention provides an LCD including: a substrate; a plurality of first and second pixel rows formed on the substrate and including a plurality of pixels; a group of first gate lines connected with the first pixel row and including a first upper gate line and a first lower gate line; a group of second gate lines connected with the second pixel row and including a second upper gate line and a second lower gate line; a plurality of data lines extending in a row direction on the substrate, wherein each of the data lines are disposed every two of the pixels; a first gate driver connected with the first upper gate line and the second lower gate line; and a second gate driver connected with the first lower gate line and the second upper gate line.

The first and second gate drivers may be integrated on the substrate.

The first and second gate drivers may be positioned at mutually opposite sides in the row direction.

The group of first gate lines may be repeated every one or more rows, and the group of second gate lines may be subsequently repeated every one or more rows.

The group of first gate lines and the group of second gate lines may be alternately adjacent.

Two of the pixels arranged adjacent in the row direction between two adjacent data lines may each be connected to the same one of the data lines.

Two of the pixels that are adjacent in a column direction may each be connected to a different one of the data lines.

A switching element for two of the pixels arranged adjacent in the row direction between two data lines may be connected with the first and second gate lines.

Positions of switching elements for two of the pixels arranged adjacent in the row direction between two adjacent data lines may be substantially the same.

An exemplary embodiment of the present invention provides a method of forming an LCD panel comprising the steps of forming a substrate, forming a first row of pixels on the substrate, forming a first gate line above the first row of pixels and a second gate line below the first row of pixels, wherein the first gate line and the second gate line are each connected to the first row of pixels, forming a second row of pixels on the substrate, forming a third gate line above the second row of pixels and a fourth gate line below the second row of pixels, wherein the third gate line and the fourth gate line are each connected to the second row of pixels, forming a plurality of date lines on the substrate in columns, wherein each of the data lines is disposed every two pixels of the first row of pixels, forming a first gate driver connected with the first and fourth gate lines, and forming a second gate driver connected with the second and third gate lines.

DETAILED DESCRIPTION OF EXEMPLARY EMBODIMENTS

Hereinafter, exemplary embodiments of the present invention will be described in detail with reference to the accompanying drawings. This invention may, however, be embodied in many different forms and should not be construed as limited to the embodiments set forth herein.

An LCD according to an exemplary embodiment of the present invention will be described with reference to FIGS. 1, 2, and 3A.

Figure 1:
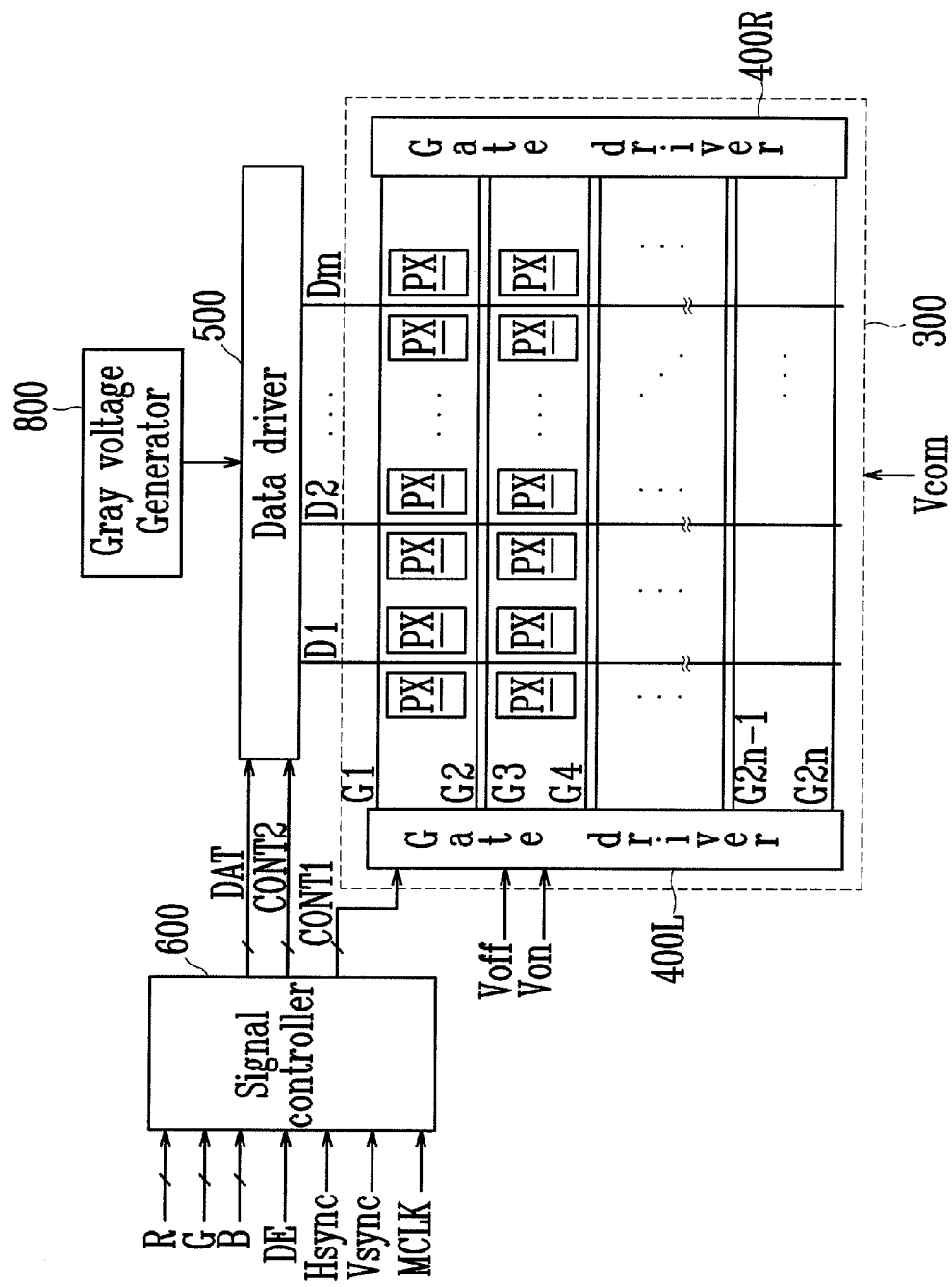
FIG. 1 is a block diagram showing a liquid crystal display (LCD) according to an exemplary embodiment of the present invention.
Figure 2:
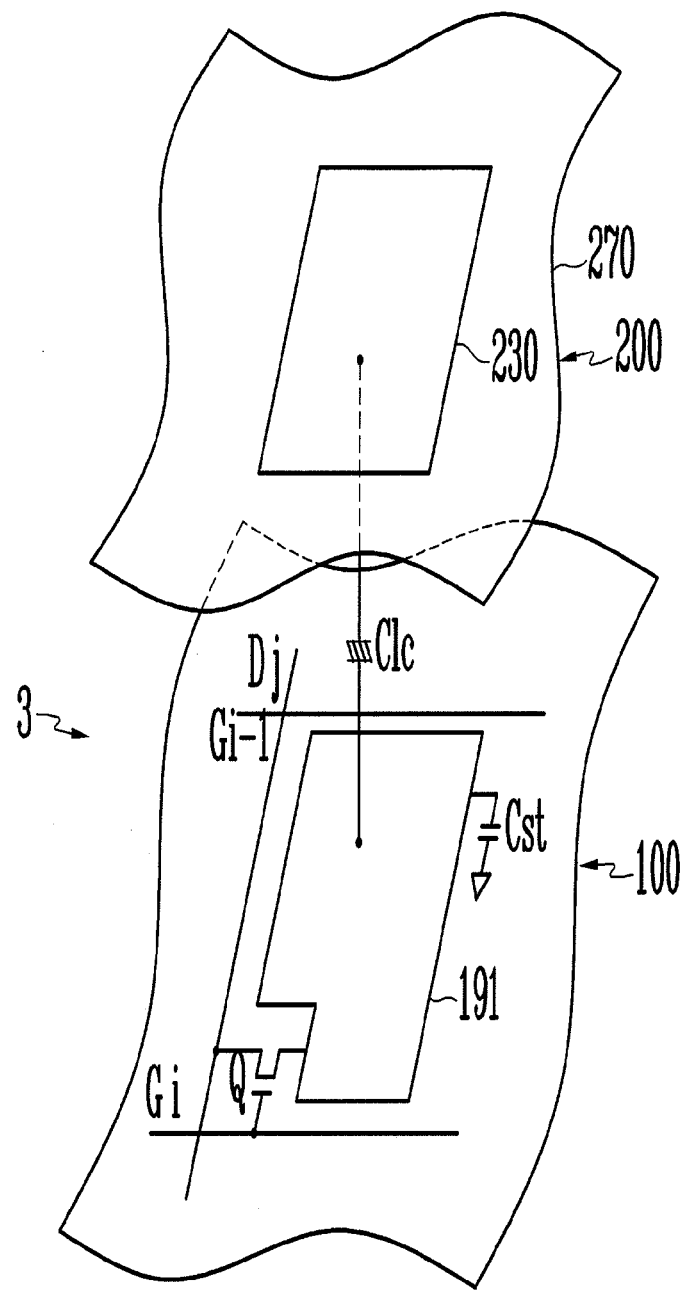
FIG. 2 is an equivalent circuit diagram of the LCD according to an exemplary embodiment of the present invention.
Figure 3A:
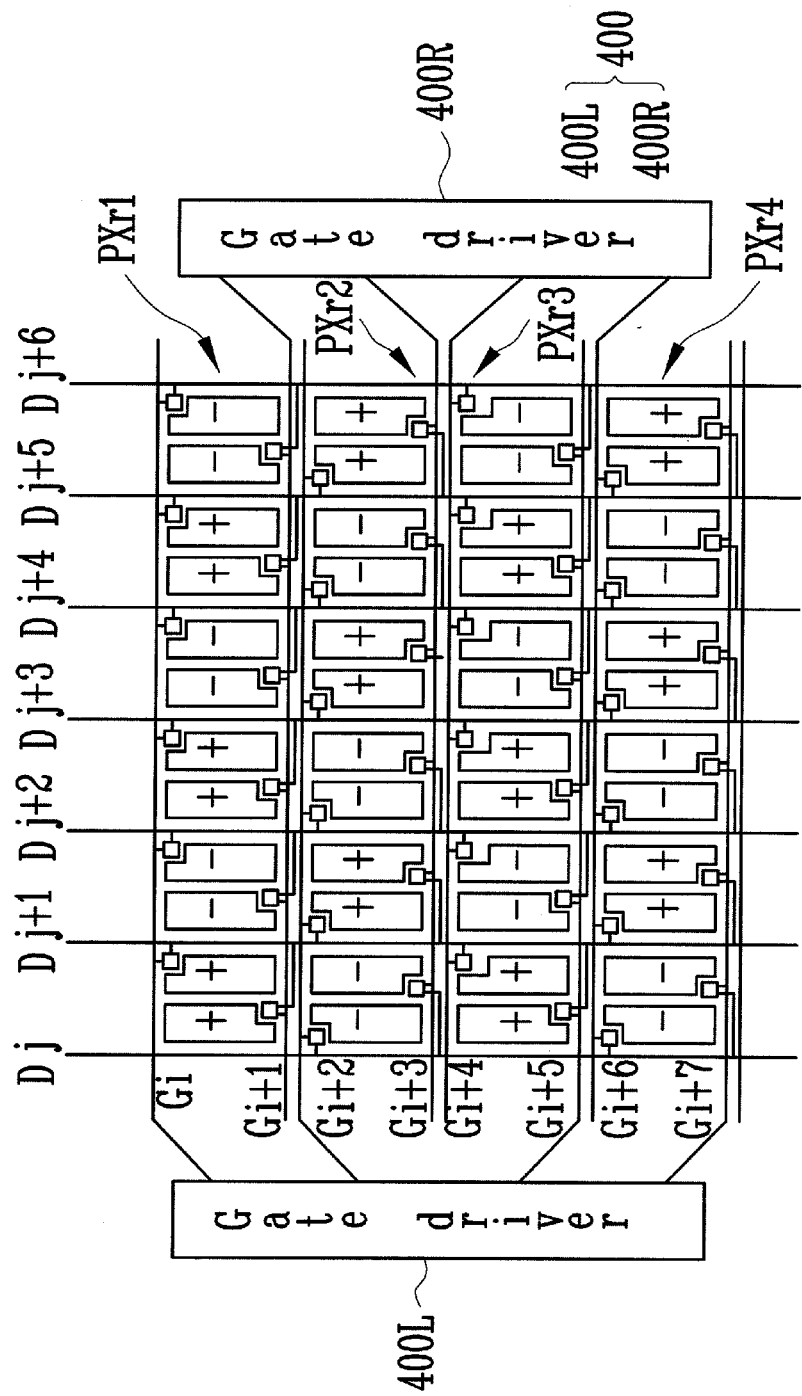
FIG. 3A is a view showing a spatial arrangement of pixels and signal lines of the LCD according to an exemplary embodiment of the present invention.

FIG. 1 is a block diagram showing a liquid crystal display (LCD) according to an exemplary embodiment of the present invention, FIG. 2 is an equivalent circuit diagram of the LCD according to an exemplary embodiment of the present invention, and FIG. 3A is a view showing a spatial arrangement of pixels and signal lines of the LCD according to an exemplary embodiment of the present invention.

With reference to FIGS. 1 and 2, the LCD includes a liquid crystal panel assembly 300, a pair of gate drivers 400R and 400L and a data driver 500 connected with the liquid crystal panel assembly 300, a gray voltage generator 800 connected with the data driver 500, and a signal controller 600 for controlling them.

The liquid crystal panel assembly 300 includes a plurality of signal lines $G_1$-$G_{2n}$ and $D_1$-$D_m$, and a plurality of pixels PX connected with the signal lines and arranged substantially in a matrix. Referring to FIG. 2, the liquid crystal panel assembly 300 includes lower and upper panels 100 and 200 and a liquid crystal layer 3.

The signal lines include a plurality of gate lines $G_1$-$G_{2n}$ for transferring gate signals (also called scanning signals) and a plurality of data lines $D_1$-$D_m$ for transferring data signals. The gate lines $G_1$-$G_n$ extend substantially in a row direction and are almost parallel with each other, and the data lines $D_1$-$D_m$ extend substantially in a column direction and also almost parallel with each other.

Each pixel PX includes a switching element Q connected with the signal lines, and a liquid crystal capacitor Clc and storage capacitor Cst connected thereto. The storage capacitor Cst is optional.

The switching element Q is a three-terminal element such as a thin film transistor provided in the lower panel 100. To the switching element Q, a control terminal is connected with the gate line $G_1$, an input terminal is connected with the data line $D_j$, and an output terminal is connected with the liquid crystal capacitor Clc and the storage capacitor Cst.

The liquid crystal capacitor Clc includes a pixel electrode 191 of the lower panel 100 and a common electrode 270 of the upper panel 200 as two terminals, and the liquid crystal layer 3 between the two electrodes 191 and 270 serves as a dielectric. The pixel electrode 191 is connected with the switching element Q, and the common electrode 270 is formed on the entire surface of the upper panel 200 and receives a common voltage Vcom. Although not illustrated in FIG. 2, the common electrode 270 may be provided on the lower panel 100, and at least one of the two electrodes 191 and 270 may have a linear or bar shape.

The storage capacitor Cst, serving as an assistant to the liquid crystal capacitor Clc, is formed as a separate signal line (not shown) provided on the lower panel 100. The storage capacitor Cst and the pixel electrode 191 overlap with an insulator interposed therebetween. A predetermined voltage such as a common voltage Vcom is applied to the separate signal line. The storage capacitor Cst can be formed as the pixel electrode 191 overlaps with an immediately previous gate line at the medium of the insulator.

As shown in FIG. 3A, each pair of gate lines $G_i$ and $G_{i+1}$, $G_{i+2}$ and $G_{i+3}$, . . . is disposed above and below one row of pixel electrodes 191. Each of data lines $D_j$, $D_{j+1}$, . . . , $D_{j+6}$ is disposed between two columns of the pixel electrodes 191. One data line is disposed between a pair of pixel arrays. Two pixels disposed between two adjacent data lines is called a pair of unit pixels.

The pairs of gate lines $G_i$ and $G_{i+1}$, . . . , $G_6$ and $G_{i+7}$ positioned above and below the pixel electrodes 191 are connected with corresponding pixel electrodes 191 through switching elements Q disposed above or below the pixel electrodes 191.

In the odd-numbered rows of pixels PXr1 and PXr3, centering on each of the data lines $D_j$, $D_{j+1}$, . . . , $D_{j+6}$, the left switching elements Q are connected with the upper gate lines $G_i$, $G_{i+4}$ and the right switching elements Q are connected with the lower gate lines $G_{i+1}$, $G_{i+5}$. In the even-numbered rows of pixels PXr2 and PXr4, the upper gate lines $G_{i+2}$, $G_{i+6}$ and the lower gate lines $G_{i+3}$, $G_{i+7}$ are connected with the switching elements Q in the opposite manner to those of the odd-numbered rows of pixels. While centering on each of the data lines $D_j$, $D_{j+1}$, . . . , $D_{j+6}$, the right switching elements Q are connected with the upper gate lines $G_{i+2}$, $G_{i+6}$ and the left switching elements Q are connected with the lower gate lines $G_{i+3}$, $G_{i+7}$.

In the odd-numbered rows of pixels PXr1 and PXr3, centering on the data lines $D_j$, $D_{j+1}$, . . . , $D_{j+6}$, the pixel electrodes 191 positioned at the left side of each data line are connected with immediately adjacent data lines through the switching elements Q and the pixel electrodes 191 positioned at the right side of each data line are connected with adjacent data lines through the switching elements Q. In the even-numbered rows of pixels PXr2 and PXr4, centering on the data lines $D_j$, $D_{j+1}$, . . . , $D_{j+6}$, the pixel electrodes 191 positioned at the left side of each data line are connected with immediately previous data lines through the switching elements Q and the pixel electrodes 191 positioned at the right side of each data line are connected with immediately adjacent data lines through the switching elements Q.

Referring to FIG. 3A, the positions of the switching elements Q are changed at each pixel row. In the odd-numbered rows of pixels PXr1 and PXr3, as for the pixels positioned at the left side of each of the data lines $D_j, D_{j+1}, \ldots, D_{j+6}$, the switching elements Q are formed at an upper end portion of the right side, and as for the pixels positioned at the right side of each of the data lines $D_j, D_{j+1}, \ldots, D_{j+6}$, the switching elements Q are formed at a lower end portion of the right side.

In the even-numbered rows of pixels PXr2 and PXr4, the positions of the switching elements Q of the pixels are opposite to those of the adjacent odd-numbered rows of pixels. In the even-numbered rows of pixels PXr2 and PXr4, the switching elements Q are formed at the lower end portion of the left side of the pixels positioned at the left side of each of the data lines $D_j, D_{j+1}, \ldots, D_{j+6}$, and the switching elements Q are formed at the upper end portion of the left side of the pixels positioned at the right side of each of the data lines $D_j, D_{j+1}, \ldots, D_{j+6}$.

The positions of the switching elements Q are changed at every row of pixels PXr1-4 to shorten the length of connections between the switching elements Q formed at the pixels and the data lines $D_j, D_{j+1}, \ldots, D_{j+6}$ as much as possible.

With respect to the connections between the pixel electrodes 191 and the data lines $D_j, D_{j+1}, \ldots, D_{j+6}$ as shown in FIG. 3A, the switching elements Q of the pair of unit pixels are connected with the same data lines in each row of pixels. In the odd-numbered rows of pixels, the switching elements Q of the pair of unit pixels are connected with the data lines positioned at the right side, and in the even-numbered rows of pixels, the switching elements Q of the pair of unit pixels are connected with the data lines positioned at the left side.

The arrangement shown in FIG. 3A is merely an example. The connections between the pixel electrodes 191 in the odd-numbered rows and the even-numbered rows and the data lines can be changed, and other connection relationships therebetween are possible.

For a color display, each pixel PX displays one of the primary colors (spatial division) or pixels PX alternately display the primary colors over time (temporal division), so that a desired color can be generated by the spatial or temporal sum of the primary colors. The primary colors can be, for example, red, green, and blue. FIG. 2 shows an example of spatial division in which each pixel PX includes a color filter 230 that displays one of the primary colors at a region of the upper panel 200 corresponding to the pixel electrode 191. Although not illustrated in FIG. 2, a color filter can be formed above or below the pixel electrode 191 of the lower panel.

In addition, at least one polarizer (not shown) for polarizing light is attached on an outer surface of the liquid crystal panel assembly 300.

Referring back to FIG. 1, the gray voltage generator 800 generates two pairs of gray voltages (or a set of reference gray voltages) related to transmittance of the pixels PX. One pair of gray voltages has a positive value with respect to the common voltage Vcom and the other pair of gray voltages has a negative value.

The gate drivers 400L and 400R are first and second gate drivers 400L and 400R respectively disposed at the right and left sides of the liquid crystal panel 300. The gate drivers 400L and 400R are connected with the gate lines $G_1$-$G_{2n}$ and apply gate signals including a combination of the gate-on voltage Von and the gate-off voltage Voff to the gate lines $G_1$-$G_{2n}$.

Referring to FIG. 3A, the gate line $G_i$ positioned above the first row of pixels PXr1 is connected with the first gate driver 400L, and the gate line $G_{i+1}$ positioned below the first row of pixels PXr1 is connected with the second gate driver 400R. Connections between the gate lines $G_{i+2}, G_{i+3}$ of the second row of pixels PXr2 and the first and second gate drivers 400L and 400R are the same as those of the first row of pixels PXr1.

Connections between the gate lines $G_{i+4}, G_{i+5}, G_{i+6}, G_{i+7}$ of the third and fourth rows of pixels PXr3 and PXr4 are the opposite to those of the first and second rows of pixels PXr1 and PXr2. The gate lines $G_{i+4}$ and $G_{i+6}$ positioned above the third and fourth rows of pixels PXr3 and PXr4 are connected with the second gate driver 400R, and the gate lines $Gi_{+5}$ and $G_{i+7}$ positioned below the third and fourth rows of pixels PXr3 and PXr4 are connected with the first gate driver 400L.

Referring to FIG. 3A, the first and second rows of pixels PXr1 and PXr2 and the first and second gate drivers 400L and 400R are called a first group pixel row, and the third and fourth rows of pixels PXr3 and PXr4 and the gate drivers 400L and 400R are called a second group pixel row.

The liquid crystal panel in FIG. 3A has a structure such that the two rows of pixels of the first group are repeated, and successively, the two rows of pixels of the second group are repeated. Although not shown in FIG. 3A, the structure is repeated in the rows of pixels starting from the fifth row of pixels.

In FIG. 3A, the pixel rows of the first group and the pixel rows of the second group are repeated twice, but the present invention is not limited thereto, for example, the pixel rows of the first group and the pixel rows of the second group can be repeated three or four times. When the overall number of gate lines is 2n (n=1, 2, 3, 4 . . . ), the pixel rows of the first group can be continuously repeated a maximum of 'n' times, and subsequently, the pixel rows of the second group can be repeated a maximum of 'n' times.

The gate drivers 400L and 400R are integrated together with the signal lines $G_1$-$G_{2n}$ and $D_1$-$D_m$ and a TFT switching element Q, or the like, on the liquid crystal panel assembly 300. The gate drivers 400L and 400R can be directly mounted as an integrated circuit (IC) chip on the panel assembly 300, can be mounted on a flexible printed circuit film (not shown) so as to be attached as a TCP (Tape Carrier Package) on the liquid crystal panel assembly 300, or can be mounted on a printed circuit board (not shown).

The data driver 500 is connected with the data lines $D_1$-$D_m$ of the liquid crystal panel assembly 300, selects a gray voltage from the gray voltage generator 800, and applies the selected gray voltage as a data signal to the data lines $D_1$-$D_m$. When the gray voltage generator 800 does not provide all the voltages with respect to every gray level, but only provides a predetermined number of reference gray voltages, the data driver 500 generates gray voltages with respect to all gray levels by dividing the reference gray voltages, and selecting a data signal among them.

The signal controller 600 controls the gate drivers 400L and 400R and the data driver 500.

The drivers, i.e., the data driver 500, the signal controller 600 and the gray voltage generator 800, can be directly mounted as at least one IC chip on the liquid crystal panel assembly 300, can be mounted on the flexible printed circuit film (not shown) so as to be attached as the TCP on the liquid crystal panel assembly 300, or can be mounted on the PCB (not shown), respectively. Alternatively, the drivers 500, 600, and 800 can be integrated together with the signal lines $G_1$-$G_{2n}$ and $D_1$-$D_m$ and the TFT switching elements Q on the liquid crystal panel assembly 300. In addition, the drivers 400, 500, 600, and 800 can be integrated as a single IC chip, and at least one of these circuits can be positioned outside the single IC chip.

The signal controller 600 receives input image signals R, G, and B and input control signals for controlling display of the input image signals from an external graphics controller (not shown). The input control signals may include, for example, a vertical synchronization signal Vsync, a horizontal synchronization signal Hsync, a main clock signal MCLK, or a data enable signal DE.

The signal controller 600 appropriately processes the input image signals R, G, and B according to operational conditions of the liquid crystal panel assembly 300 based on the input image signals R, G, and B and the input control signals, generates a gate control signal CONT1 and a data control signal CONT2, and transmits the gate control signal CONT1 to the gate drivers 400L and 400R and the data control signal CONT2 and the processed image signal DAT to the data driver 500.

The gate control signal CONT1 includes a scanning start signal STV for instructing start of scanning, and at least one clock signal for controlling an output period of the gate-on voltage Von. The gate control signal CONT1 may additionally include an output enable signal OE for limiting a duration of the gate-on voltage Von.

The data control signal CONT2 includes a horizontal synchronization start signal STH for indicating that image data has begun transmission to one row of pixels PX, and a load signal LOAD for indicating application of data signals to the data lines $D_1$-$D_m$, and a data clock signal HCLK. The data control signal CONT2 may additionally include an inversion signal RVS for inverting polarity of a voltage of a data signal with respect to the common voltage Vcom (which is called 'polarity of a data signal').

The data driver 500 receives the digital image signal DAT with respect to one row of pixels PX according to the data control signal CONT2 received from the signal controller 600, selects a gray voltage corresponding to each digital image signal DAT, converts the digital image signal DAT into an analog data signal, and applies it to a corresponding data line $D_1$-$D_m$.

The gate drivers 400L and 400R apply the gate-on voltage Von to the gate lines $G_1$-$G_{2n}$ according to the gate control signal CONT1 received from the signal controller 600, to turn on switching elements Q connected with the gate lines $G_1$-$G_{2n}$. Then, the data signal that has been applied to the data lines $D_1$-$D_m$ is applied to the corresponding pixels PX through the switching elements Q that have been turned on.

The difference between a voltage of the data signal applied to the pixels PX and the common voltage Vcom appears as a charge voltage of the liquid crystal capacitor Clc, namely, as a pixel voltage. Arrangement of liquid crystal molecules is changed according to the size of the pixel voltage, and polarization of light that passes through the liquid crystal layer 3 is changed accordingly. The change in the polarization appears as a change in transmittance of light by a polarizer attached on the display panel assembly 300.

This process is repeatedly performed by units of one horizontal period (namely, '1H' which is equivalent to one period of the horizontal synchronization signal Hsync and the data enable signal DE), whereby the gate-on voltage Von can be sequentially applied to all the gate lines $G_1$-$G_{2n}$ to apply the data signals to all the pixels PX, thereby displaying an image of one frame.

When one frame is finished, the next frame is started and a state of the inversion signal RVS applied to the data driver 500 is controlled ('frame inversion') so that polarity of the data signals applied to each pixel PX can be opposite to the polarity of a previous frame. Even in one frame, the polarity of a data signal flowing through one data line can be changed according to characteristics of the inversion signal RVS (e.g., row inversion, dot inversion), or the polarity of a data signal applied to one row of pixels can be different (e.g., column inversion, dot inversion).

The driving operation of the LCD according to an exemplary embodiment of the present invention will be described in detail with reference to FIGS. 3B and 3C.

Figure 3B:
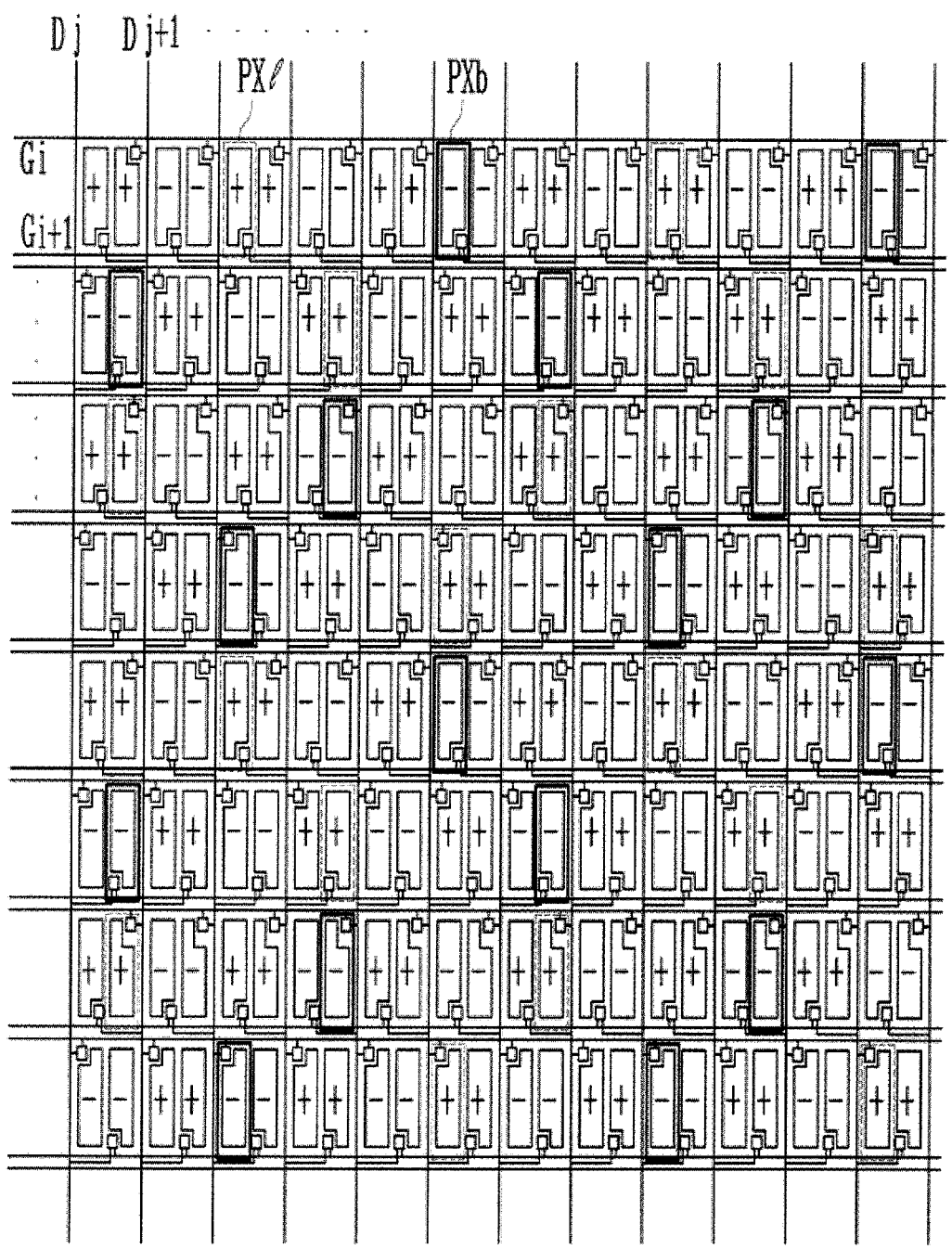
FIGS. 3B and 3C show how the LCD of FIG. 3A is driven.
Figure 3C:
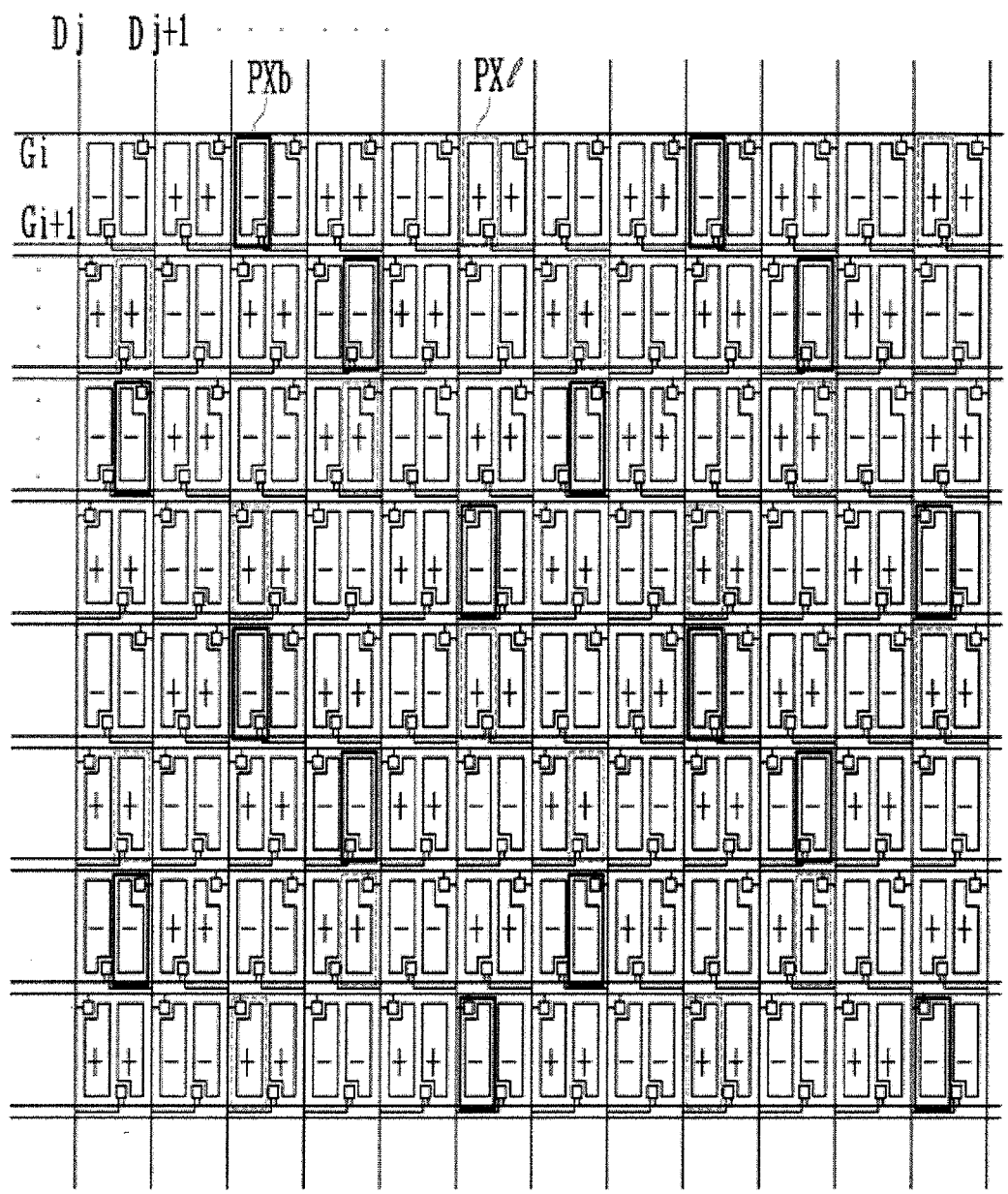

FIGS. 3B and 3C show mutually inverted operations of the LCD of FIG. 3A.

In the LCD in FIGS. 3B and 3C, units of pixels of FIG. 3A are disposed 2×2.

When the gate-on voltage Von is applied to the gate drivers 400L and 400R according to the gate control signal CONT1 received from the signal controller 600, the gate-on voltage Von is applied to one of a pair of the gate lines $G_1$-$G_{2n}$ and switching elements Q connected thereto are turned on. Subsequently, the gate-on voltage Von is also applied to the other pair of gate lines $G_1$-$G_{2n}$ and switching elements Q connected to the gate line are also turned on. Then, the data signals that have been applied to the data lines $D_1$-$D_m$ are applied to the corresponding pixels PX through the turned-on switching elements Q.

However, due to parasitic capacitance existing between the gate lines $G_1$-$G_{2n}$ and the pixel electrode 191, when the gate-on voltage is lowered to the gate-off voltage, the data voltage is slightly reduced, generating a first kickback voltage Vkb.

Subsequently, when the next gate-on voltage is lowered to the gate-off voltage, a second kickback voltage Vkb is generated.

At the pixel electrode 191 where the second kickback voltage Vkb is generated, a pixel electrode voltage is adjusted closer to the common voltage Vcom at a portion that is inverted from negative (−) polarity to positive (+) polarity, so that the corresponding pixels PX become brighter than a normal state.

At the pixel electrode 191 where the second kickback voltage Vkb is generated, a pixel electrode voltage is adjusted away from the common voltage Vcom at a portion that is inverted from positive (+) polarity to negative (−) polarity, so that the corresponding pixels PX become darker than the normal state.

With reference to FIG. 3B, among pixels where the second kickback voltage is generated, pixels PX1 indicated by the dotted lines are inverted from negative (−) polarity to positive (+) polarity and thus become brighter than the normal state, while pixels PXb indicated by the solid lines are inverted from the positive (+) polarity to negative (−) polarity and thus become darker than the normal state. When a frame is inverted, the state shown in FIG. 3B is changed to a state shown in FIG. 3C. The pixels PX1 that were bright in FIG. 3B become dark in FIG. 3C, and the pixels PXb that were dark in FIG. 3B become bright in FIG. 3C. As the frames are repeated, the LCD of FIG. 3A undergoes the change in states as shown in FIGS. 3B and 3C.

If the pixels PX1 that are brighter than the normal state and the pixels PXb that are darker than the normal state are present continuously in a row direction, vertical line blurs with different luminances appear. In addition, although the frames are inverted, if a user changes their head position or moves their eyes, vertical blurs appear such that vertical lines appear to be moving. In comparison, in the LCD according to the present exemplary embodiment, the pixels PX1 and PXb, which have different luminances as they become brighter or darker than the normal state as shown in FIGS. 3B and 3C, are suitably mixed to be displayed in the display panel. Thus, no display blur occurs in the horizontal or vertical direction.

Figure 4:
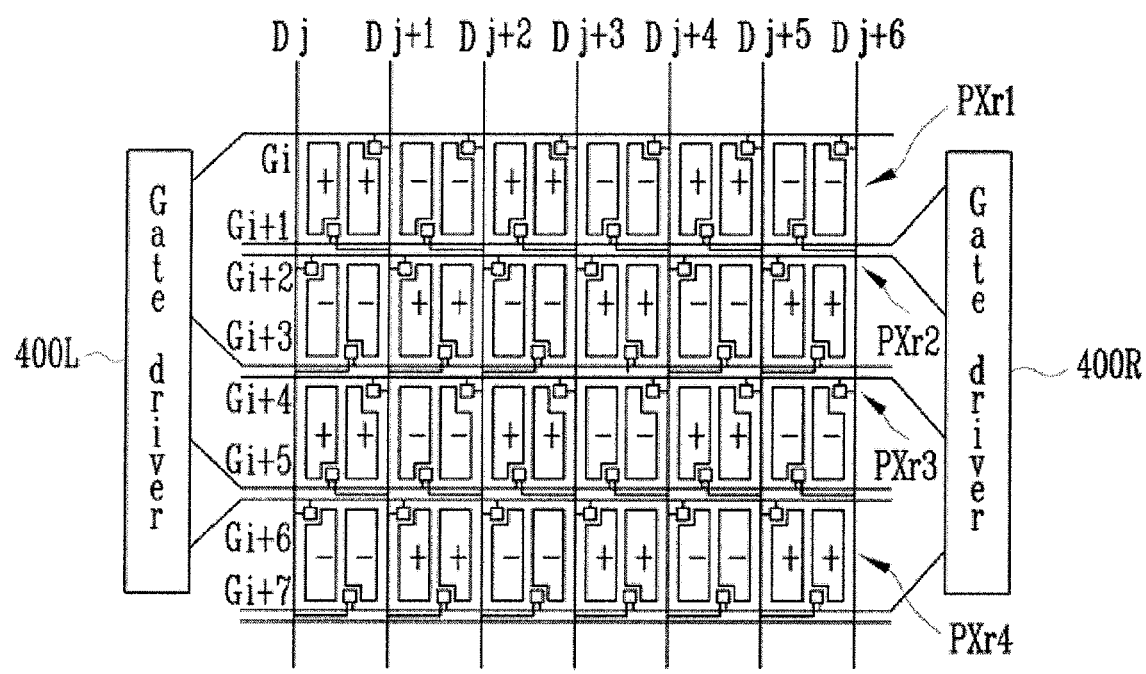
FIG. 4 is a view showing a spatial arrangement of pixels and signal lines of an LCD according to an exemplary embodiment of the present invention.

FIG. 4 is a view showing a spatial arrangement of pixels and signal lines of the LCD according to an exemplary embodiment of the present invention.

With reference to FIG. 4, in the LCD, pairs of gate lines $G_i$ and $G_{i+1}$, $G_{i+2}$ and $G_{i+3}$, ..., $G_{i+6}$ and $G_{i+7}$ are arranged above and below one row of pixel electrodes 191. Each of the data lines $D_j$, $D_{j+1}$, ..., $D_{j+6}$ is arranged between two columns of pixel electrodes 191. The pairs of gate lines $G_i$ and $G_{i+1}$, ..., $G_6$ and $G_{i+7}$ positioned above and below the pixel electrodes 191 are connected with corresponding pixel electrodes 191 through the switching elements Q disposed above or below the pixel electrodes 191. In the odd-numbered rows of pixels PXr1 and PXr3, centering on each of the data lines $D_j$, $D_{j+1}$, ..., $D_{j+6}$, the left switching elements Q are connected with the upper gate lines $G_i$, $G_{i+4}$ and the right switching elements Q are connected with the lower gate lines $G_{i+1}$, $G_{i+5}$. In the even-numbered rows of pixels PXr2 and PXr4, the upper gate lines $G_{i+2}$, $G_{i+6}$ and the lower gate lines $G_{i+3}$, $G_{i+7}$ are connected with the switching elements Q in the opposite manner to those of the odd-numbered rows of pixels. In the odd-numbered rows of pixel electrodes 191, centering on the data lines $D_j$, $D_{j+1}$, ..., $D_{j+6}$, the pixel electrodes 191 positioned at the left side of each data line are connected with immediately adjacent data lines through the switching elements Q and the pixel electrodes 191 positioned at the right side of each data line are connected with adjacent data lines through the switching elements Q. In the even-numbered rows of pixel electrodes 191, centering on the data lines $D_j$, $D_{j+1}$, ..., $D_{j+6}$, the pixel electrodes 191 positioned at the left side of each data line are connected with immediately previous data lines through the switching elements Q and the pixel electrodes 191 positioned at the right side of each data line are connected with the immediately adjacent data lines through the switching elements Q. In each row of pixels, switching elements Q of the pair of unit pixels are connected with the same data lines.

However, unlike the LCD shown in FIG. 3A, in the LCD shown in FIG. 4, a first group pixel row, in which the gate line positioned above one row of pixels is connected with the first gate driver 400L and the gate line positioned below one row of pixels is connected with the second gate driver 400R, and a second group pixel row, in which the gate line positioned above one row of pixels is connected with the second gate driver 400R and the gate line positioned below one row of pixels is connected with the first gate driver 400L, are disposed adjacent to one another. Another second group pixel row is disposed to adjacent to the second group pixel row, and subsequently, two different types of rows of pixels among the first group or second group pixel rows are repeatedly disposed.

In FIG. 4, the first group pixel row is disposed at an uppermost position, but the second group pixel row can also be disposed at the uppermost position, or the positions of the first group pixel row and the second group pixel row can be changed on the entire display panel. In addition, the first group pixel row and the second group pixel row are repeated by units of two pixel rows, but the present invention is not limited thereto, for example, the first group pixel row and the second group pixel row can be repeated by units of more pixel rows within the total number of gate lines.

Figure 5A:
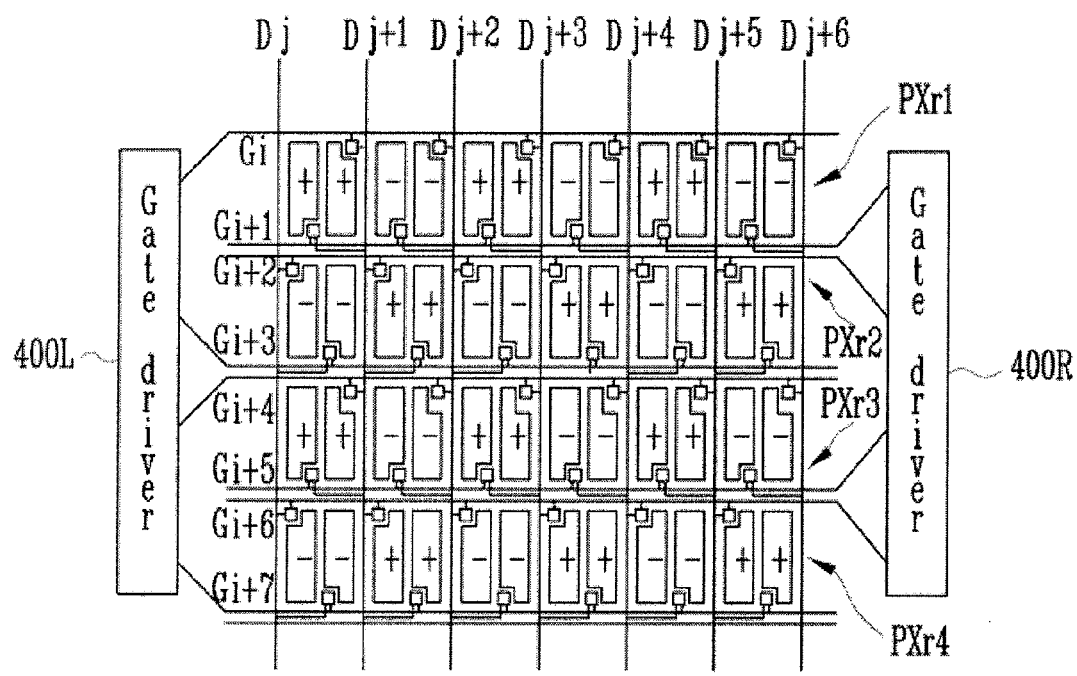
FIG. 5A is a view showing a spatial arrangement of pixels and signal lines of the LCD according to an exemplary embodiment of the present invention.
Figure 5B:
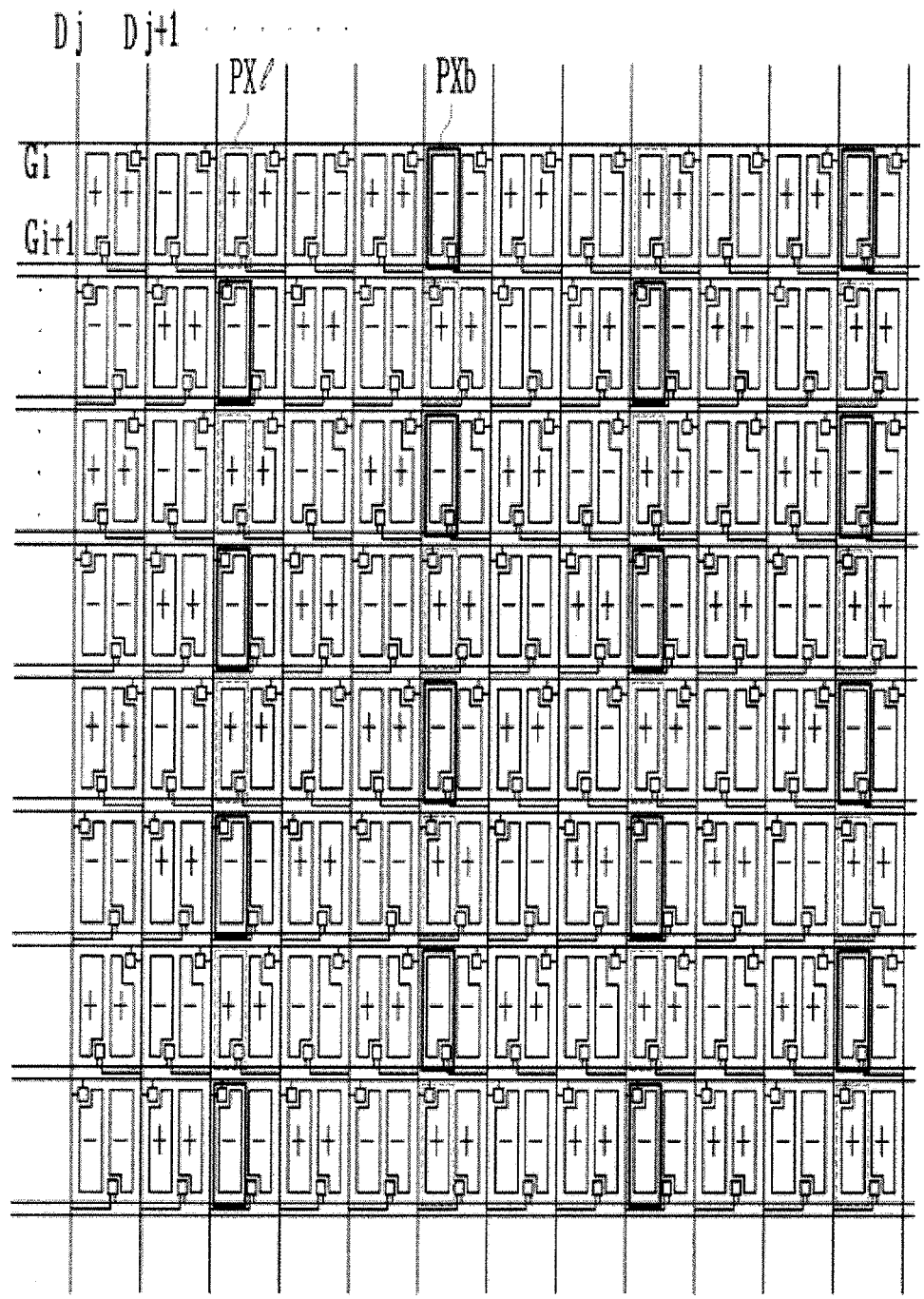
FIGS. 5B and 5C show how the LCD of FIG. 5A is driven.
Figure 5C:
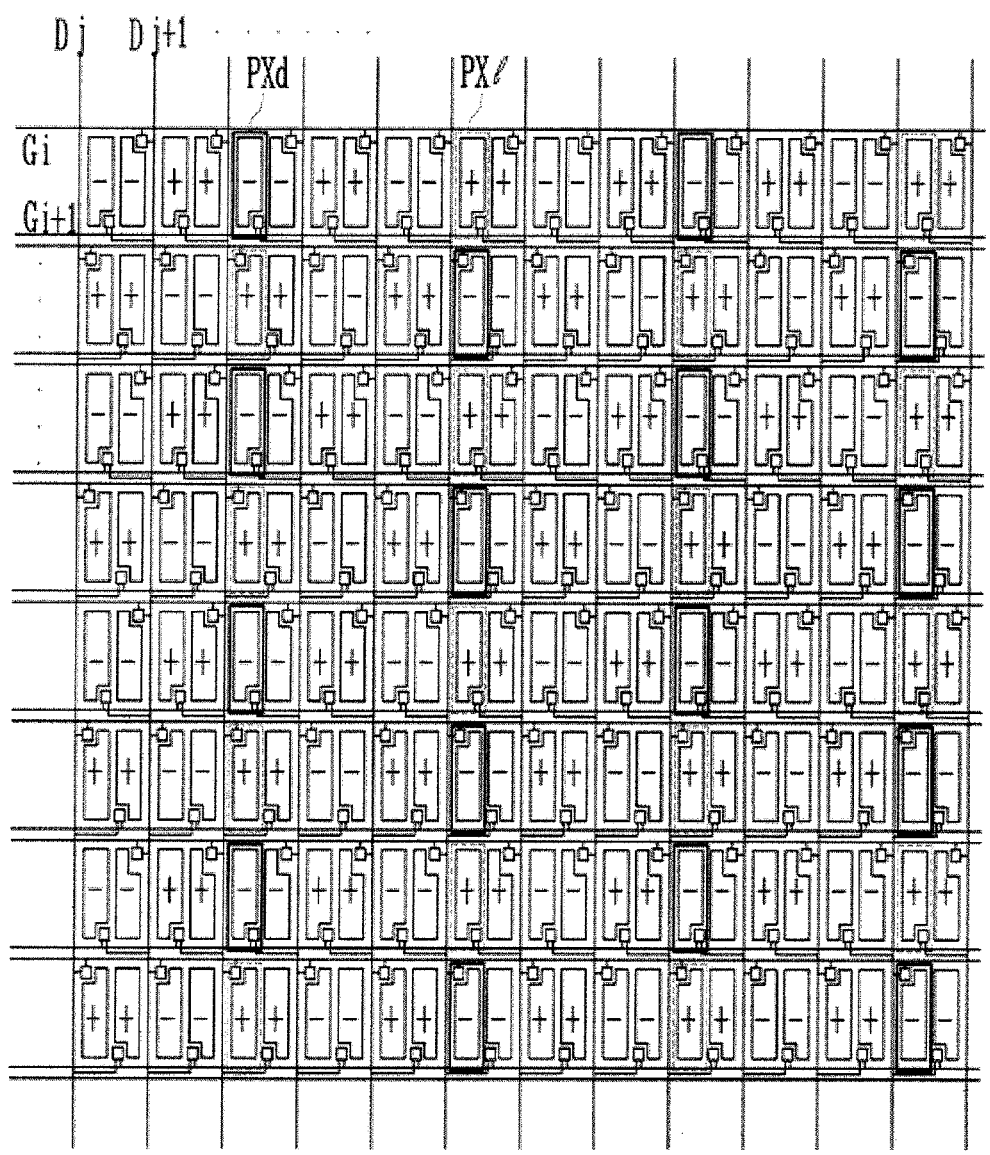

FIG. 5A is a view showing a spatial arrangement of pixels and signal lines of an LCD according to an exemplary embodiment of the present invention, and FIGS. 5B and 5C show how the LCD of FIG. 5A is driven.

In the LCD as shown in FIG. 5, each pair of gate lines $G_i$ and $G_{i+1}$, $G_{i+2}$ and $G_{i+3}$, ... are disposed above and below one row of pixel electrodes 191.

Each of data lines $D_j$, $D_{j+1}$, ..., $D_{j+6}$ is disposed between two columns of pixel electrodes 191.

The pairs of gate lines $G_i$ and $G_{i+1}$, ..., $G_6$ and $G_{i+7}$ positioned above and below the pixel electrodes 191 are connected with corresponding pixel electrodes 191 through the switching elements Q disposed above or below the pixel electrodes 191.

In the odd-numbered rows of pixels PXr1 and PXr3, centering on each of the data lines $D_j$, $D_{j+1}$, ..., $D_{j+6}$, the left switching elements Q are connected with the upper gate lines $G_i$, $G_{i+4}$ and the right switching elements Q are connected with the lower gate lines $G_{i+1}$, $G_{i+5}$.

In the even-number rows of pixels PXr2 and PXr4, the upper gate lines $G_{i+2}$, $G_{i+6}$ and the lower gate lines $G_{i+3}$, $G_{i+7}$ are connected with the switching elements Q in the opposite manner to those of the odd-numbered rows of pixels.

In the odd-numbered rows of pixel electrodes 191, centering on the data lines $D_j$, $D_{j+1}$, ..., $D_{j+6}$, the pixel electrodes 191 positioned at the left side of each data line are connected with immediately adjacent data lines through the switching elements Q and the pixel electrodes 191 positioned at the right side of each data line are connected with adjacent data lines through the switching elements Q.

In the even-numbered rows of pixel electrodes 191, centering on the data lines $D_j$, $D_{j+}$, ..., $D_{j+6}$, the pixel electrodes 191 positioned at the left side of each data line are connected with immediately previous data lines through the switching elements Q and the pixel electrodes 191 positioned at the right side of each data line are connected with the immediately adjacent data lines through the switching elements Q.

In each row of pixels, switching elements Q of the pair of unit pixels are connected with the same data lines.

However, unlike the LCDs shown in FIG. 3A and FIG. 4, in the LCD shown in FIG. 5A, a first group pixel row, in which the gate line positioned above one row of pixels is connected with the first gate driver 400L and the gate line positioned below one row of pixels is connected with the second gate driver 400R, and a second group pixel row, in which the gate line positioned above one row of pixels is connected with the second gate driver 400R and the gate line positioned below one row of pixels is connected with the first gate driver 400L, are disposed adjacent to one another.

With reference to FIGS. 5B and 5C, among pixels where the second kickback voltage is generated, pixels PX1 indicated by the dotted lines are inverted from negative (−) polarity to positive (+) polarity and thus become brighter than the normal state, while pixels PXb indicated by the solid lines are inverted from the positive (+) polarity to negative (−) polarity and thus become darker than the normal state.

In FIG. 5B, the pixels PX1 that are brighter than the normal state and the pixels PXb that are darker than the normal state are adjacently repeated in one row.

When the frame is inverted, the state as shown in FIG. 5B is changed to a state as shown in FIG. 5C.

The pixels PX1 that were bright in FIG. 5B become dark in FIG. 5C, and the pixels PXb that were dark in FIG. 5B become bright in FIG. 5C.

As the frames are repeated, the LCD of FIG. 5A undergoes the change in the states as shown in FIGS. 5B and 5C.

Since the pixels each with a different luminance are adjacently disposed in one pixel array, the difference in luminance is appropriately canceled out to prevent generation of vertical or horizontal blur.

Figure 6:
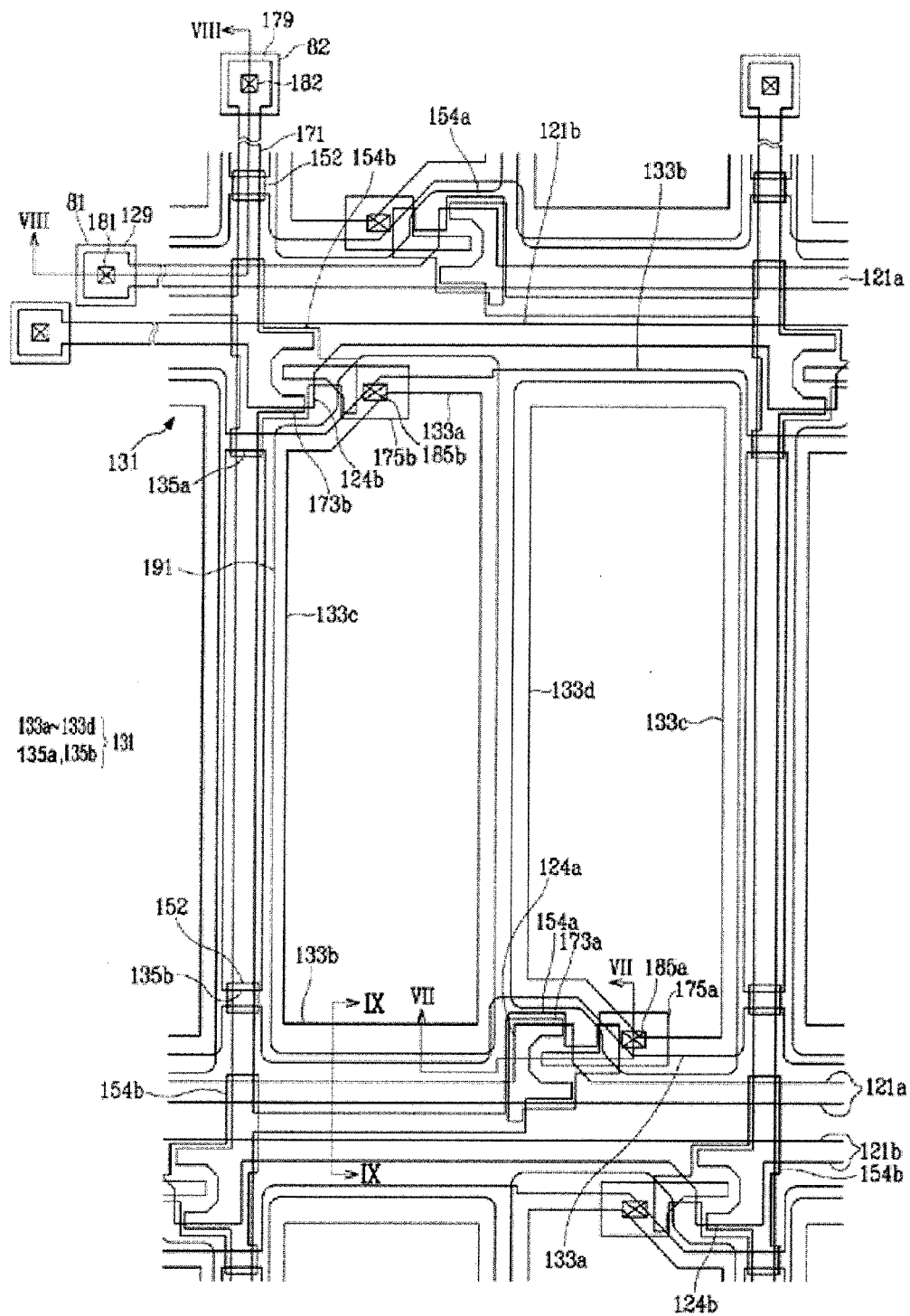
FIG. 6 is a layout view showing an LCD according to an exemplary embodiment of the present invention.
Figure 7:
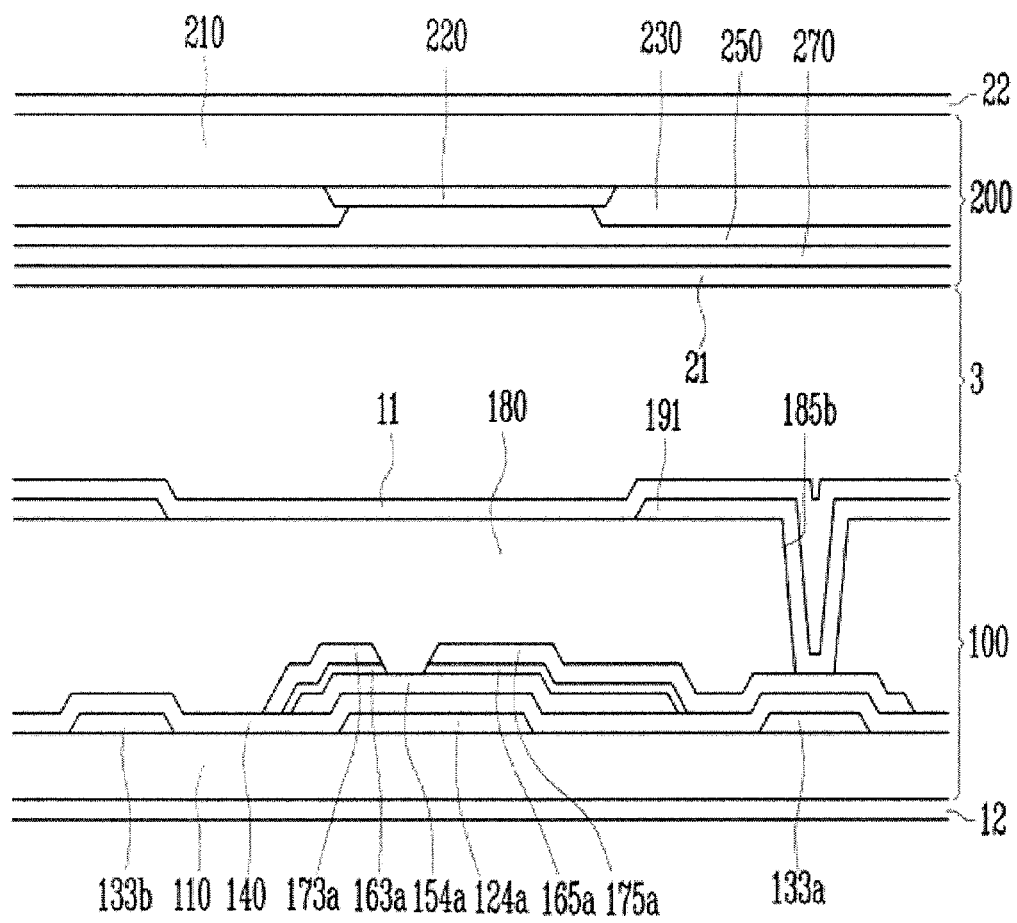
FIGS. 7 to 9 are cross-sectional views taken along lines VII-VII, VIII-VIII, and IX-IX of the LCD of FIG. 6.
Figure 8:
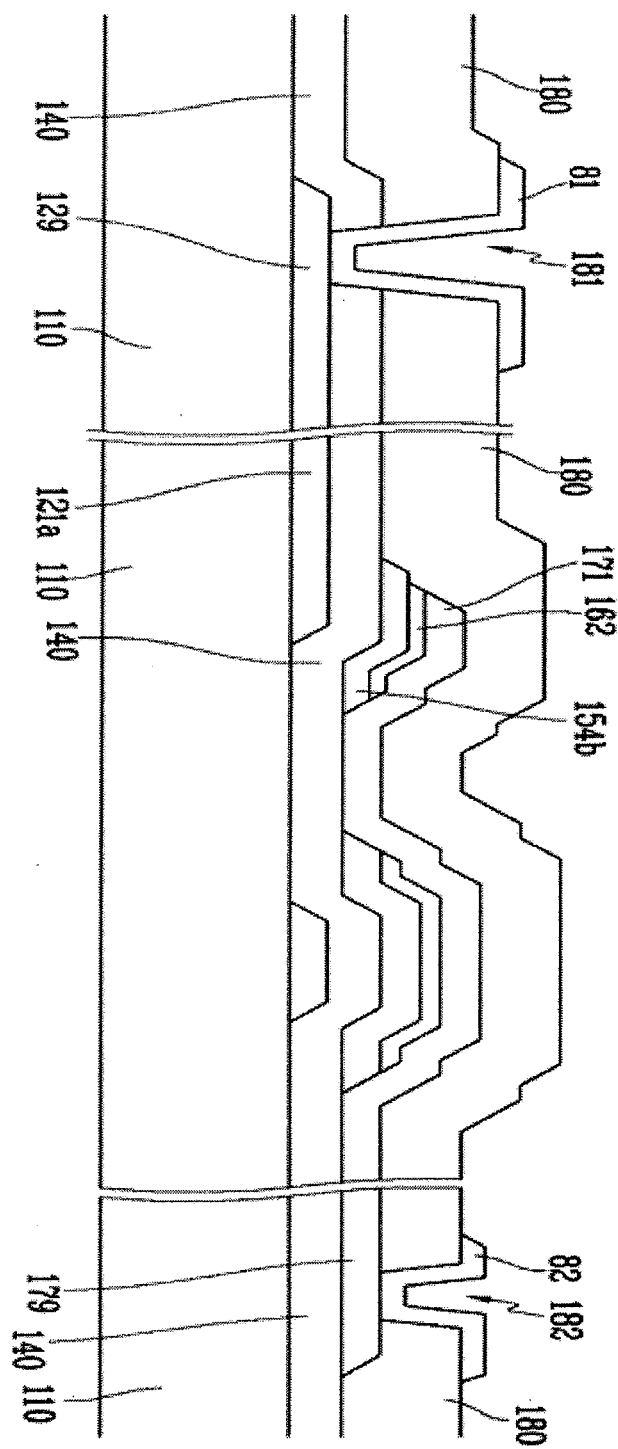
Figure 9:
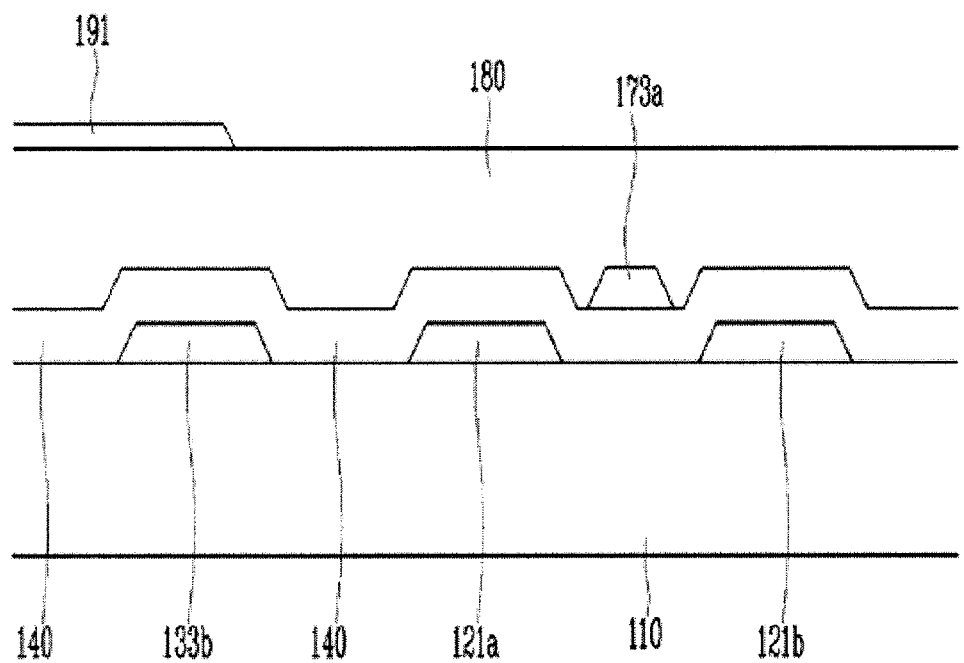

FIG. 6 is a layout view showing an LCD according to an exemplary embodiment of the present invention, and FIGS. 7 to 9 are cross-sectional views taken along lines VII-VII, VIII-VIII, and IX-IX of the LCD of FIG. 6.

With reference to FIGS. 6 to 9, a liquid crystal panel assembly according to the exemplary embodiment of the present invention includes a TFT array panel 100, a common electrode panel 200, and a liquid crystal layer 3 interposed between the two panels 100 and 200.

A plurality of gate conductors including pairs of first and second gate lines 121a and 121b and a plurality of storage electrode lines 131 are formed on an insulation substrate 110 which is made of, for example, transparent glass or plastic.

The first and second gate lines 121a and 121b transfer gate signals and extend mainly in a horizontal direction. The first gate lines 121a are positioned above the second gate lines 121b The first gate lines 121a include a plurality of first gate electrodes 124a that protrude downward and a large end portion 129 for connection with a different layer or the gate drivers 400L and 400R.

The second gate lines 121b include a plurality of second gate electrodes 124b that protrude upward and a large end portion 129 for a connection with a different layer or the gate drivers 400L and 400R.

When the gate drivers 400L and 400R are integrated on the substrate 100, the gate lines 121a and 121b can be extended to be directly connected thereto.

The storage electrode lines 131 receive a predetermined voltage such as the common voltage Vcom, and are separated from the gate lines 121a and 121b.

Each of the storage electrode lines 131 includes a set of a plurality of storage electrodes 133a, 133b, 133c, and 133d that are connected with each other to form a pair of rectangular shapes, and a pair of storage electrode connection portions 135a and 135b.

A set of storage electrodes 133a-133d includes a pair of first and second storage electrodes 133a and 133b that extend mainly in the horizontal direction, and a pair of third storage electrodes 133c that extend mainly in the vertical direction with the fourth storage electrode 133d positioned therebetween and extending in a vertical direction.

Centering on the fourth storage electrode 133d, the first to third storage electrodes 133a-133c are disposed at both sides of the fourth storage electrode 133d, forming the rectangular shapes by sharing the fourth storage electrode 133d. The two rectangular shapes have a 180 degree rotation symmetrical relation based on the center of the fourth storage electrode 133d.

The storage electrode connection portions 135a and 135b connect the adjacent storage electrodes 133c of the two adjacent sets of the storage electrodes 133a-133d, and the storage electrode 133a is bent near the first gate electrode 124a.

The shapes and dispositions of the storage electrodes 133a and 133b and the storage electrode lines 131 can be modified to various forms.

The gate conductors 121a, 121b, and 131 can be made of, for example, a metal such as aluminum (Al), silver (Ag), copper (Cu), molybdenum (Mo), chromium (Cr), tantalum (Ta), titanium (Ti), and alloys thereof.

The gate conductors 121a, 121b, and 131 may also have a multi-layered structure including two or three conductive layers (not shown) each having different physical properties.

One of the conductive layers can be made of a material with low resistivity, such as Al, Ag, Cu, or alloys thereof to reduce a signal delay or a voltage drop.

Another one of the conductive layers can be made of, for example, a material such as Mo, Cr, Ta, Ti, and alloys thereof that have good physical, chemical, and electrical contact characteristics with a different material, for example, ITO (Indium Tin Oxide) and IZO (Indium Zinc Oxide).

Examples of such combinations may include a combination of a lower chromium layer and an upper aluminum (alloy) layer, and a combination of a lower aluminum (alloy) layer and an upper molybdenum (alloy) layer, and a combination of a lower molybdenum (alloy) layer and a middle aluminum (alloy) layer and an upper molybdenum (alloy) layer.

In addition, the gate conductors 121a, 121b, and 131 can be made of various other metals or conductors.

The sides of the gate conductors 121a, 121b, and 131 are sloped to the surface of the substrate 110, and the slope angle may be within the range of about 30° to about 80°.

A gate insulating layer 140 made of silicon nitride (SiNx), silicon oxide (SiOx) or silicon oxynitride(SiONx) is formed on the gate conductors 121a, 121b, and 131.

A plurality of semiconductor islands 152, 154a, and 154b made of, for example, hydrogenated amorphous silicon (a-Si:H) or polycrystalline silicon, are formed on the gate insulating layer 140.

The semiconductor islands 154a and 154b are positioned on the gate electrodes 124a and 124b, respectively, to cover them, and extend to also cover the gate lines 121a and the storage electrode connection portion 135a.

In addition, the semiconductor island 152 covers the storage electrode connection portion 135b.

A plurality of ohmic contact islands 163a, and 165a are formed on the first semiconductor island 154a.

The ohmic contact islands 163a and 165a can be made of a material such as n+ hydrogenated amorphous silicon in which an n-type impurity such as phosphor is doped with a high density, or silicide.

The ohmic contact islands 163a and 165a are disposed as pairs on the semiconductor island 154a, and other ohmic contact islands (not shown) are disposed as pairs on the semiconductor island 154b.

The sides of the semiconductor islands 154a and 154b and the ohmic contact islands 163a and 165a are also sloped to the surface of the substrate 110, and the slope angle may be within the range of about 30° to about 80°.

Data conductors including a plurality of data lines 171 and a pair of first and second drain electrodes 175a and 175b are formed on the ohmic contact islands 163a and 165a and the gate insulating layer 140.

The data lines 171 transfer data signals and extend mainly in the vertical direction to cross the gate lines 121a and 121b and the storage electrode line 131. The data lines 171 include a pair of first and second 'C'-shaped source electrodes 173a and 173b that extend toward the first and second gate electrodes 124a and 124b, and a large end portion 179 for connection with a different layer or the data driver 500.

The first and second drain electrodes 175a and 175b are separated from each other and are also separated from the data lines 171. The first and second drain electrodes 175a and 175b face the first and second source electrodes 173a and 173b centering on the first and second gate electrodes 124a and 124b. The first and second drain electrodes 175a and 175b each include one end portion in a bar shape.

The extending portions 177a and 177b overlap with the storage electrodes 133a and 133b, respectively.

The bar-type end portions of the drain electrodes 175a and 175b are partially surrounded by source electrodes 173a and 173b.

The first and second gate electrodes 124a and 124b, the first and second source electrodes 173a and 173b, and the first and second drain electrodes 175a and 175b constitute first and second TFTs together with the first and second semiconductor islands 154a and 154b. A channel of the first and second TFTs is formed at the first and second semiconductor islands 154a and 154b between the source electrodes 173a and 173b and the first and second drain electrodes 175a and 175b.

The data conductors 171, 175a, and 175b may be made of a refractory metal such as molybdenum, chromium, tantalum, and titanium, and their alloys, and can have a multi-layered structure including a refractory metal layer (not shown) and a low-resistance conductive layer (not shown).

Examples of the multi-layered structure may include a dual-layer of a lower chromium or molybdenum (alloy) layer and an upper aluminum (alloy) layer, and a triple-layer of a lower molybdenum (alloy) layer, an intermediate aluminum (alloy) layer, and an upper molybdenum (alloy) layer.

The data conductors 171, 175a, and 175b can also be made of various other metals or conductors.

The sides of the data conductors 171, 175a, and 175b may be sloped to the surface of the substrate 110 at a slope angle within the range of about 30° to about 80°.

The ohmic contact islands 163a and 165a are present between the lower semiconductor islands 154a and 154b and the upper data conductors 171, 175a, and 175b to lower contact resistance therebetween.

Some portions of the semiconductor islands 154a and 154b, including a portion between the source electrodes 173a and 173b and the drain electrodes 175a and 175b, are exposed without being covered by the data conductors 171, 175a, and 175b.

A passivation layer 180 is formed on the data conductors 171, 175a, and 175b, and on the exposed portions of the semiconductor islands 154a and 154b.

The passivation layer 180 may be made of, for example, an inorganic insulator or an organic insulator, and may have a planarized surface.

The organic insulator may have a dielectric constant of 4.0 or less, and may have photosensitivity.

The passivation layer 180 may also have a dual-layer structure of a lower inorganic layer and an upper organic layer so that it may not do harm to the exposed portions of the semiconductor islands 154a and 154b, while sustaining the insulation characteristics of the organic layer.

At the passivation layer 180, there are formed a plurality of contact holes 182 exposing the end portions 179 of the data lines 171, and pairs of contact holes 185a and 185b exposing the extending portions 177a and 177b of the first and second drain electrodes 175a and 175b.

At the passivation layer 180 and the gate insulating layer 140, there are formed a plurality of contact holes 181 exposing the end portions 129 of the gate lines 121a and 121b.

A plurality of pixel electrodes 191 and a plurality of contact assistant 81 and 82 are formed on the passivation layer 180, and can be made of a transparent conductive material such as ITO or IZO, or a reflective material such as aluminum, silver, chromium or their alloys.

The pixel electrode 191 is physically and electrically connected with the drain electrodes 175a and 175b through the contact hole 185, and receives a data voltage from the drain electrodes 175a and 175b.

The pixel electrode 191 to which the data voltage has been applied, generates an electric field together with a common electrode 270 of the common electrode panel 200, which receives a common voltage, thereby determining a direction of liquid crystal molecules of the liquid crystal layer 3 interposed between the two electrodes 191 and 270.

Polarization of light that passes through the liquid crystal layer 3 differs depending on the determined direction of the liquid crystal molecules.

The pixel electrode 191 and the common electrode 270 form a capacitor (referred to hereinafter as 'liquid crystal capacitor') to sustain the applied voltage even after the TFT is turned off.

The pixel electrode 191 overlaps with the storage electrode line 131 including the storage electrodes 133a~133d. A capacitor connected with the pixel electrode 191 and overlapping with the storage electrode line 131 is called a storage capacitor, which strengthens voltage storage capability of the liquid crystal capacitor.

The pixel electrode 191 covers the end portion elongated from the drain electrodes 175a and 175b and the storage electrode 133a, and partially overlaps with the storage electrodes 133b, 133c, and 133d such that a boundary line of the pixel electrode 191 is positioned on the storage electrodes 133b, 133c, and 133d.

The storage electrode 133b is exposed between the gate lines 121a and 121b and the boundary line of the pixel electrode 191, and a voltage change of the pixel electrode 191 due to parasitic capacitance present between the pixel electrode 191 and the gate line 121a can be reduced.

The contact assistants 81 and 82 are connected with the end portions 129 of the gate lines 121a and 121b and the end portions 179 of the data line 171 through the contact holes 181 and 182, respectively.

The contact assistant 81 and 82 support adhesion of the end portions 129 of the gate lines 121a and 121b and the end portions 179 of the data line 171 with an external device, and protect them.

A light blocking member 220 is formed on an insulation substrate 210 and may be made of a material such as transparent glass or plastic.

The light blocking member 220 may include a bent portion (not shown) corresponding to a bent side of the pixel electrode 191 and a rectangular portion (not shown) corresponding to TFTs. The light blocking member 220 prevents light leakage between pixel electrodes 191 and defines an opening that faces the pixel electrodes 191.

A plurality of color filters 230 are formed on the substrate 210 and the light blocking member 220.

The color filters 230 are mostly present within regions surrounded by the light blocking members 230, and may extend along the rows of the pixel electrodes 191. Each of the color filters 230 may display one of the three primary colors of red, green, and blue.

An overcoat 250 is formed on the color filters 230 and the light blocking member 220. The overcoat 250 can be made of an (organic) insulator, prevents exposure of the color filters 230, and provides a smooth surface. The overcoat 250 is optional. A common electrode 270 is formed on the overcoat 250.

Alignment layers 11 and 21 are formed on an inner surface of the display panels 100 and 200, respectively, and can be vertical alignment layers. Polarizers 12 and 22 are provided on an outer surface of the display panels 100 and 200, respectively.

The LCD may include a backlight unit (not shown) for providing light to the polarizers 12 and 22, a phase delay layer, display panels 100 and 200, and the liquid crystal layer 3.

The liquid crystal layer has negative dielectric anisotropy, and liquid crystal molecules of the liquid crystal layer 3 are aligned such that their longer axes are perpendicular to the surfaces of the two display panels 100 and 200 when there is no electric field.

Figure 10:
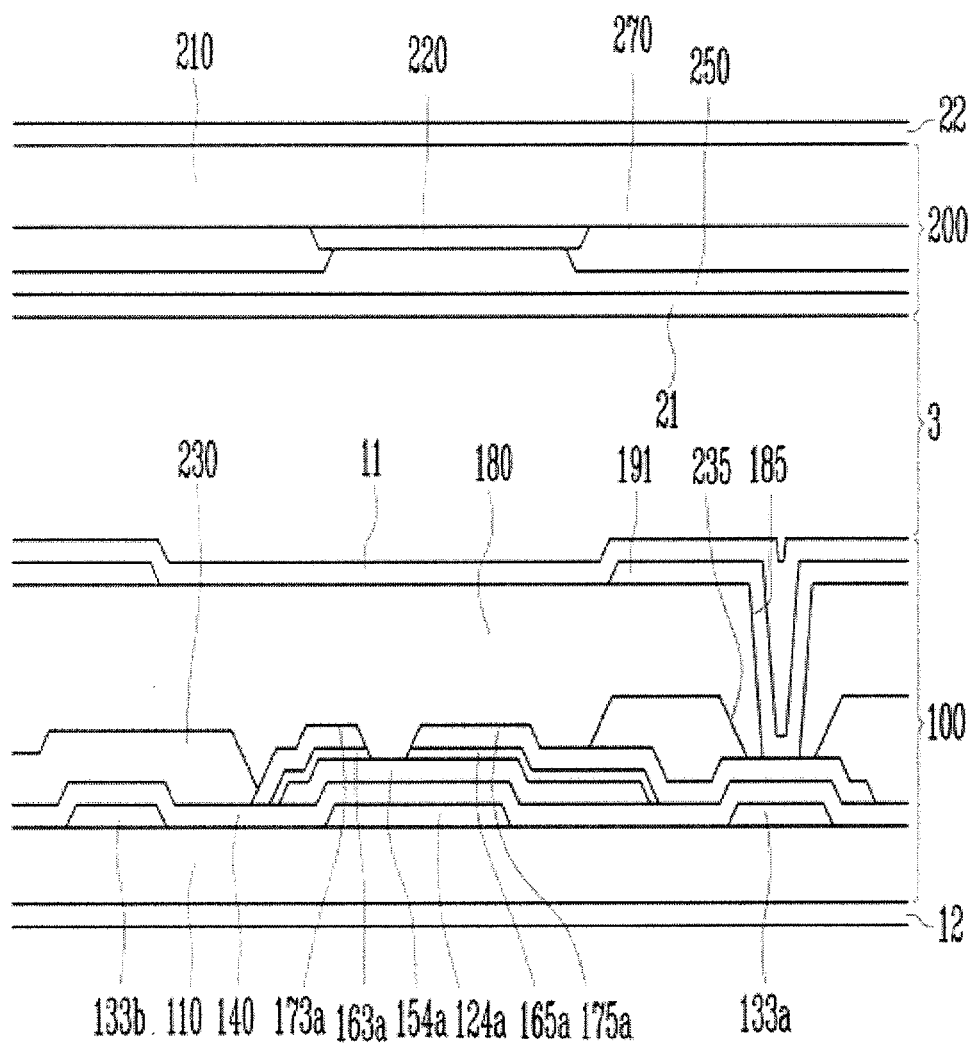
FIG. 10 is a cross-sectional view showing an LCD according to an exemplary embodiment of the present invention.

FIG. 10 is a cross-sectional view of an LCD according to an exemplary embodiment of the invention.

As shown in FIG. 10, a liquid crystal panel assembly according to the present exemplary embodiment also includes a lower panel 100 and an upper panel 200 that face each other, and a liquid crystal layer 3 interposed between the two panels.

Referring to the lower panel 100, a plurality of gate conductors including a pair of first and second gate lines (not shown) and a plurality of storage electrode lines (not shown) are formed on the insulation substrate 110.

Each of the gate lines includes a gate electrode 124a and an end portion (not shown), and each storage electrode line includes storage electrodes 133a and 133b.

A gate insulating layer 140 is formed on the gate conductors.

A plurality of semiconductor islands 154a are formed on the gate insulating layer 140, and a plurality of ohmic contact islands 163a and 165a are formed on the semiconductor islands 154a.

Data conductors including a plurality of data lines (not shown) and first drain electrodes 175a and second drain electrodes (not shown) are formed on the ohmic contact islands 163a and 165a and the gate insulating layer 140.

The data lines include a plurality of source electrodes 173a and end portions (not shown), and the drain electrodes 175a include a large end portion (not shown).

A passivation layer 180 is formed on the data conductors 175a and an exposed portion of the semiconductor island 154a, and a plurality of contact holes 185 are formed on the passivation layer 180 and the gate insulating layer 140.

A plurality of pixel electrodes 191 and a plurality of contact assistants (not shown) are formed on the passivation layer 180.

An alignment layer 11 is formed on the pixel electrodes 191, the contact assistants, and the passivation layer 180.

Referring to the upper panel 200, a light blocking member 220, a plurality of color filters 230, an overcoat 250, a common electrode 270, and an alignment layer 21 are formed at a lower portion of an insulation substrate 210.

The liquid crystal panel assembly as shown in FIG. 10 is different from the liquid crystal panel assembly as shown in FIGS. 6 to 9 in that the LCD according to the present exemplary embodiment is constructed such that the common electrode panel 200 does not have the color filters 230 but the plurality of color filters 230 are formed at the lower portion of the passivation layer 180 of the TFT array panel 100.

The color filter 230 extends in a band along the columns of the pixel electrodes 191, and two adjacent color filters 230 overlap at an upper portion of the data lines.

The overlapping color filters 230 are formed of an organic layer to insulate the pixel electrodes 191 and the data lines.

Although the insulating layer 180 is not formed of an organic layer, no parasitic capacitance is generated at the portion where the pixel electrodes 191 and the data lines 171 overlap.

The color filters 230 can also serve as a light blocking member for preventing light leakage between pixel electrodes 191. When the colors filters 230 are used as the light blocking member, formation of the light blocking member on the common electrode panel 200 is not necessary, thus simplifying a process of constructing an LCD.

Each of the color filters 230 include a through hole 235 for allowing the contact hole 185 to pass therethrough, and the through hole 235 is larger than the contact hole 185.

The color filters 230 do not exist at a peripheral area where the end portion 129 of the gate line 121 and an end portion of the data line are positioned.

A passivation layer (not shown) may be formed at a lower portion of the color filters 230.

Having described exemplary embodiments of the present invention, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) comprising:
a substrate,
first and second pixel rows formed on the substrate and comprising a plurality of pixels, the plurality of pixels comprising a plurality of pairs of pixels, the pairs of pixels comprising two adjacent pixels in a pixel row;
a first gate line extending in a row direction on the substrate and connected with the first pixel row;
a second gate line extending in the row direction on the substrate, connected with the first pixel row;
a third gate line extending in the row direction on the substrate, connected with the second pixel row, and adjacent to the second gate line;
a fourth gate line extending in the row direction on the substrate, connected with the second pixel row;
a plurality of data lines extending in a column direction on the substrate, wherein the data lines are disposed every two of the pixels;
a first gate driver connected with the first and fourth gate lines, for applying gate signals to the first and fourth gate lines; and
a second gate driver connected with the second and third gate lines, for applying gate signals to the second and third gate lines,
wherein a part of a data line is disposed between two adjacent pairs of pixels and the data line is connected to only one pair of pixels of the two adjacent pairs of pixels, wherein no data line is present between the two pixels of the one pair.

2. The LCD of claim 1, wherein
the first gate line is disposed above the first pixel row, the second gate line is disposed below the first pixel row, and the first pixel row is disposed between the first and second gates lines, and
the third gate line is disposed above the second pixel row, the fourth gate line is disposed below the second pixel row, and the second pixel row is disposed between the third and fourth gate lines.

3. The LCD of claim 1, wherein the first and second gate drivers are integrated on the substrate.

4. The LCD of claim 1, wherein the first and second gate drivers are positioned at mutually opposite sides in the row direction.

5. A liquid crystal display (LCD) comprising:
a substrate,
a plurality of first and second pixel rows formed on the substrate and comprising a plurality of pixels, the plurality of pixels comprising a plurality of pairs of pixels, the pairs of pixels comprising two adjacent pixels in a pixel row;
a group of first gate lines connected with the first pixel row and comprising a first upper gate line and a first lower gate line;
a group of second gate lines connected with the second pixel row and comprising a second upper gate line and a second lower gate line;

a plurality of data lines extending in a column direction on the substrate, wherein each of the data lines are disposed every two of the pixels;

a first gate driver connected with the first upper gate line and the second lower gate line; and a second gate driver connected with the first lower gate line and the second upper gate line, wherein part of a data line is disposed between two adjacent pairs of pixels and the data line is connected to only one pair of pixels of the two adjacent pairs of pixels, wherein two of the pixels adjacent in a column direction are connected to a different one of the data lines.

6. The LCD of claim 5, wherein the first and second gate drivers are integrated on the substrate.

7. The LCD of claim 5, wherein the first and second gate drivers are positioned at mutually opposite sides in the row direction.

8. The LCD of claim 5, wherein the group of first gate lines is repeated every one or more rows, and the group of second gate lines is subsequently repeated every one or more rows.

9. The LCD of claim 5, wherein the group of first gate lines and the group of second gate lines are alternately adjacent.

10. The LCD of claim 5, wherein two of the pixels arranged adjacent in the row direction between two adjacent data lines are connected to the same one of the data lines.

11. The LCD of claim 5, wherein a switching element for two of the pixels arranged adjacent in the row direction between two of the data lines is respectively connected with the first and second gate lines.

12. The LCD of claim 5, wherein positions of switching elements for two of the pixels arranged adjacent in the row direction between two adjacent data lines are substantially the same.

13. A method of forming an LCD panel, comprising:
forming a substrate;
forming a first row of pixels on the substrate;
forming a first gate line above the first row of pixels and a second gate line below the first row of pixels, wherein the first gate line and the second gate line are each connected to the first row of pixels;
forming a second row of pixels on the substrate;
forming a third gate line above the second row of pixels and a fourth gate line below the second row of pixels, wherein the third gate line and the fourth gate line are each connected to the second row of pixels;
forming a plurality of data lines on the substrate in columns, wherein each of the data lines is disposed every two pixels of the first row of pixels;
forming a first gate driver connected with the first and fourth gate lines; and
forming a second gate driver connected with the second and third gate lines,
wherein the pixels comprises a plurality of pairs of pixels, wherein the pairs of pixels comprises two adjacent pixels in a pixel row, and wherein a part of a data line is disposed between two adjacent pairs of pixels and the data line is connected to only one pair of pixels of the two adjacent pairs of pixels,
wherein the part is adjacent a part of a lower side of one pixel of one of the pairs it is connected to and adjacent an entire lower side of the other pixel of the one pair.

14. The method of claim 13, wherein the second and third gate lines are formed adjacent to one another.

15. The method of claim 13, wherein the LCD is driven when the first gate driver applies a first gate signal to the first and fourth gate lines and the second gate driver applies a second gate signal to the second and third gate lines.

16. The method of claim 13, wherein the first and second gate drivers are integrated on the substrate.

17. The LCD of claim 1, wherein the data line connects to one pixel of the one pair of the two adjacent pairs of pixels and to the other pixel of the one pair of pixels.

18. The LCD of claim 5, wherein the data line connects to one pixel of the one pair of the two adjacent pairs of pixels and to the other pixel of the one pair of pixels.

19. The method of claim 13, wherein the data line connects to one pixel of the one pair of the two adjacent pairs of pixels and to the other pixel of the one pair of pixels.

* * * * *